US009580932B2

United States Patent
Gerlings et al.

(10) Patent No.: US 9,580,932 B2
(45) Date of Patent: Feb. 28, 2017

(54) TWO-PIECE KEY ASSEMBLY

(71) Applicant: The Hillman Group Inc., Cincinnati, OH (US)

(72) Inventors: Phillip Gerlings, Chandler, AZ (US); Michael James Schmidt, Queen Creek, AZ (US); Gary Edward Will, Gold Canyon, AZ (US); Bryan K. Solace, Chandler, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 0 days.

(21) Appl. No.: 14/969,924

(22) Filed: Dec. 15, 2015

(65) Prior Publication Data

US 2016/0097219 A1    Apr. 7, 2016

Related U.S. Application Data

(62) Division of application No. 14/252,412, filed on Apr. 14, 2014.
(Continued)

(51) Int. Cl.
*E05B 19/14* (2006.01)
*E05B 19/04* (2006.01)
(Continued)

(52) U.S. Cl.
CPC .............. *E05B 19/14* (2013.01); *B23C 3/35* (2013.01); *B23P 15/005* (2013.01);
(Continued)

(58) Field of Classification Search
CPC ...... E05B 19/04; E05B 19/00; E05B 19/0082; E05B 19/14; E05B 19/0058;
(Continued)

(56) References Cited

U.S. PATENT DOCUMENTS 3,780,550 A    12/1973  Simorghi
3,797,291 A     3/1974  Simorghi
(Continued)

FOREIGN PATENT DOCUMENTS

EP    1338732    8/2003
EP    2000303    12/2008
(Continued)

OTHER PUBLICATIONS

Phillip Gerlings, U.S. Appl. No. 14/263,551, entitled "Fabrication System for Key Making Machine", filed Apr. 28, 2014.
(Continued)

*Primary Examiner* — Suzanne Barrett
(74) *Attorney, Agent, or Firm* — Finnegan, Henderson, Farabow, Garrett & Dunner LLP

(57) ABSTRACT

A key assembly is disclosed. The key assembly may have a blade with a head portion, a shank, and a transition region connecting the head portion to the shank. The key assembly may also have a head configured to receive the blade. The head may have a shoulder located at the transition region to limit engagement of the head with the blade, and at least one tang located at an end of the head opposite the shoulder. The at least one tang may be configured to engage a recess located within a side of the head portion and inhibit removal of the head from the blade.

13 Claims, 5 Drawing Sheets

Related U.S. Application Data

(60) Provisional application No. 61/866,603, filed on Aug. 16, 2013, provisional application No. 61/904,810, filed on Nov. 15, 2013.

(51) Int. Cl.

| | |
|---|---|
| *G07F 17/00* | (2006.01) |
| *H04N 5/235* | (2006.01) |
| *B23C 3/35* | (2006.01) |
| *B23P 15/00* | (2006.01) |
| *G06K 9/00* | (2006.01) |
| *G06K 9/20* | (2006.01) |
| *E05B 19/00* | (2006.01) |

(52) U.S. Cl.
CPC .......... *E05B 19/0058* (2013.01); *E05B 19/04* (2013.01); *G06K 9/00* (2013.01); *G06K 9/2036* (2013.01); *G07F 17/0014* (2013.01); *H04N 5/2354* (2013.01); *B23C 2235/28* (2013.01); *B23C 2235/41* (2013.01); *G06K 2209/19* (2013.01); *Y10T 70/7842* (2015.04); *Y10T 409/300952* (2015.01)

(58) Field of Classification Search
CPC ...... G07C 2009/00984; A45C 13/1076; A44B 15/005; F16G 15/06; A44C 5/0038; Y10T 70/7842; Y10T 409/300952; G07F 17/0014; H04N 5/2354; B23C 3/35; B23C 2235/28; B23C 2235/41; B23P 15/005; G06K 9/00; G06K 9/2036; G06K 2209/19
USPC .............................. 70/337, 406, 409, 456 R
See application file for complete search history.

(56) References Cited

U.S. PATENT DOCUMENTS

| | | | |
|---|---|---|---|
| 4,235,087 A | 11/1980 | Bianchi | |
| 4,666,351 A | 5/1987 | Marchal | |
| 4,899,391 A | 2/1990 | Cimino et al. | |
| 4,901,548 A | 2/1990 | Deslandes | |
| 5,167,171 A | 12/1992 | Heredia | |
| 5,351,409 A | 10/1994 | Heredia | |
| 5,383,345 A | 1/1995 | Kallinger-Prskawetz-Jacobsen | |
| 5,517,299 A * | 5/1996 | Teratani ............. G07C 9/00658 356/394 | |
| 5,538,374 A | 7/1996 | Cole et al. | |
| 5,538,534 A | 7/1996 | Cole et al. | |
| 5,546,316 A | 8/1996 | Buckley et al. | |
| 5,556,240 A | 9/1996 | Almblad | |
| 5,569,003 A | 10/1996 | Goldman et al. | |
| 5,607,267 A | 3/1997 | Heredia et al. | |
| 5,660,509 A | 8/1997 | Cole et al. | |
| 5,676,504 A | 10/1997 | Mueller et al. | |
| 5,739,766 A | 4/1998 | Chaloux | |
| 5,764,156 A | 6/1998 | Chaloux | |
| 5,807,042 A | 9/1998 | Almblad et al. | |
| 5,833,406 A | 11/1998 | Chies et al. | |
| 5,844,808 A | 12/1998 | Konsmo et al. | |
| 5,906,365 A | 5/1999 | Wu | |
| 5,908,273 A | 6/1999 | Titus et al. | |
| 5,951,218 A | 9/1999 | Wu | |
| 5,956,985 A | 9/1999 | Chang | |
| 5,964,554 A | 10/1999 | Drori | |
| 5,974,844 A | 11/1999 | Harrelson et al. | |
| 5,997,224 A | 12/1999 | Beauregard et al. | |
| 6,064,747 A | 5/2000 | Wills et al. | |
| 6,065,911 A | 5/2000 | Almblad et al. | |
| 6,106,131 A | 8/2000 | Hao | |
| 6,152,662 A | 11/2000 | Titus et al. | |
| 6,185,311 B1 | 2/2001 | Yanovsky et al. | |
| 6,237,756 B1 | 5/2001 | Caudle | |
| 6,371,286 B1 | 4/2002 | Montanari | |
| 6,406,227 B1 | 6/2002 | Titus et al. | |
| 6,449,381 B1 | 9/2002 | Yanovsky et al. | |
| 6,543,972 B1 | 4/2003 | Cimino | |
| D475,195 S | 6/2003 | Christianson | |
| 6,588,995 B2 | 7/2003 | Wills et al. | |
| 6,595,045 B1 | 7/2003 | Fuglewicz et al. | |
| 6,602,030 B1 | 8/2003 | Markbreit | |
| 6,641,339 B2 | 11/2003 | Chies et al. | |
| 6,647,308 B1 | 11/2003 | Prejean | |
| 6,684,673 B2 | 2/2004 | Florendo | |
| 6,782,725 B2 | 8/2004 | Linares | |
| 6,801,829 B2 | 10/2004 | Kawai | |
| 6,839,449 B1 | 1/2005 | Campbell et al. | |
| 6,892,558 B2 | 5/2005 | Chodosh | |
| 6,895,100 B1 | 5/2005 | Pacenzia et al. | |
| 7,055,352 B2 | 6/2006 | Meyerson et al. | |
| 7,077,607 B2 | 7/2006 | Foscan | |
| 7,167,892 B2 | 1/2007 | Defossé et al. | |
| 7,214,011 B2 | 5/2007 | Ryai, Sr. et al. | |
| 7,380,428 B2 | 6/2008 | Morehart et al. | |
| 7,387,476 B2 | 6/2008 | Ryai, Sr. | |
| 7,527,458 B2 | 5/2009 | Ryai, Sr. et al. | |
| D618,983 S | 7/2010 | Downes | |
| 7,890,878 B2 | 2/2011 | Bass et al. | |
| 7,891,919 B2 | 2/2011 | Bass et al. | |
| 7,918,629 B2 | 4/2011 | Belflower et al. | |
| 8,074,481 B2 | 12/2011 | Bass et al. | |
| 8,126,764 B2 | 2/2012 | Murray et al. | |
| 8,128,322 B2 | 3/2012 | Bass et al. | |
| 8,142,117 B2 | 3/2012 | Belflower et al. | |
| 8,191,779 B2 | 6/2012 | Illingworth et al. | |
| 8,214,247 B2 | 7/2012 | Murray et al. | |
| 8,215,625 B2 | 7/2012 | Wu | |
| 8,225,696 B2 | 7/2012 | Downes | |
| 8,287,215 B2 | 10/2012 | Freeman et al. | |
| 8,292,556 B2 | 10/2012 | Ryai, Sr. et al. | |
| D674,590 S | 1/2013 | Busch | |
| 8,342,783 B2 | 1/2013 | Ryai, Sr. | |
| 8,373,558 B2 | 2/2013 | Sagady et al. | |
| 8,484,068 B2 | 7/2013 | Godwin et al. | |
| 8,484,070 B2 | 7/2013 | Murray et al. | |
| 8,532,809 B2 | 9/2013 | Freeman | |
| 8,600,546 B1 | 12/2013 | Hagen et al. | |
| 8,634,951 B2 | 1/2014 | Freeman | |
| 9,243,426 B2 * | 1/2016 | Gerlings ................. E05B 19/04 |
| 2004/0148988 A1 | 8/2004 | Taylor | |
| 2004/0253067 A1 | 12/2004 | Bosch | |
| 2006/0048553 A1 | 3/2006 | Almquist | |
| 2006/0090528 A1 | 5/2006 | Moening | |
| 2009/0228795 A1 | 9/2009 | Bass et al. | |
| 2010/0052234 A1 | 3/2010 | Ryai, Sr. | |
| 2010/0278437 A1 | 11/2010 | Thompson et al. | |
| 2010/0278438 A1 | 11/2010 | Thompson et al. | |
| 2010/0316250 A1 | 12/2010 | Perrigo | |
| 2011/0110741 A1 | 5/2011 | Huss et al. | |
| 2011/0167377 A1 | 7/2011 | Bass et al. | |
| 2011/0176881 A1 | 7/2011 | Bass et al. | |
| 2011/0262240 A1 | 10/2011 | Mutch et al. | |
| 2011/0297691 A1 | 12/2011 | Freeman | |
| 2011/0301738 A1 | 12/2011 | Freeman | |
| 2012/0014762 A1 | 1/2012 | Ryai, Sr. et al. | |
| 2012/0038453 A1 | 2/2012 | Bass et al. | |
| 2012/0154127 A1 | 6/2012 | Donadini | |
| 2012/0213603 A1 | 8/2012 | Bass et al. | |
| 2012/0243957 A1 | 9/2012 | Drake et al. | |
| 2013/0017030 A1 | 1/2013 | Freeman et al. | |
| 2013/0039714 A1 | 2/2013 | Ryai, Sr. et al. | |
| 2013/0094918 A1 | 4/2013 | Ryai, Sr. | |

FOREIGN PATENT DOCUMENTS

| | | |
|---|---|---|
| EP | 2517826 | 10/2012 |
| WO | WO 8912867 | 12/1989 |

OTHER PUBLICATIONS

Phillip Gerlings, U.S. Appl. No. 14/263,595, entitled "Identification Module for Key Making Machine", filed Apr. 28, 2014.

(56) References Cited

OTHER PUBLICATIONS

"Green Curtain Projects Confidential", Dec. 2009.
International Search Report mailed on Mar. 19, 2015 listing PCT/US2014/049740 filed on Aug. 5, 2014.
International Search Report mailed on Mar. 19, 2015 listing PCT/US2014/049901 filed on Aug. 6, 2014.
International Search Report mailed on Mar. 19, 2015 listing PCT/US2014/050047 filed on Aug. 7, 2014.

* cited by examiner

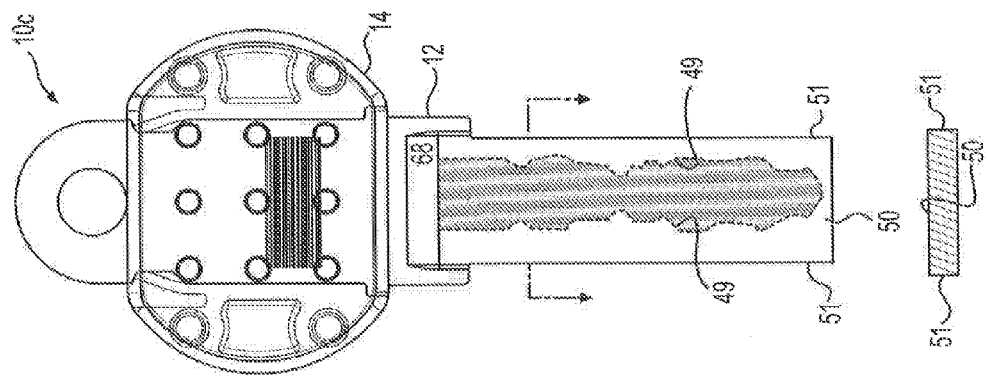
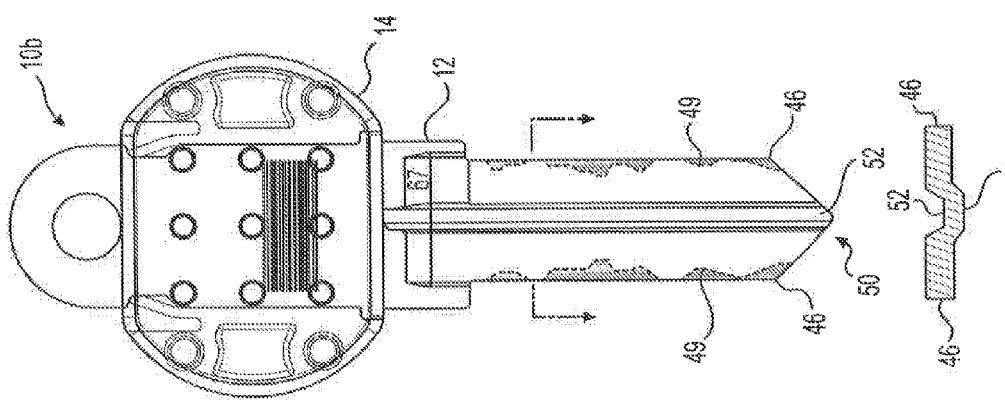
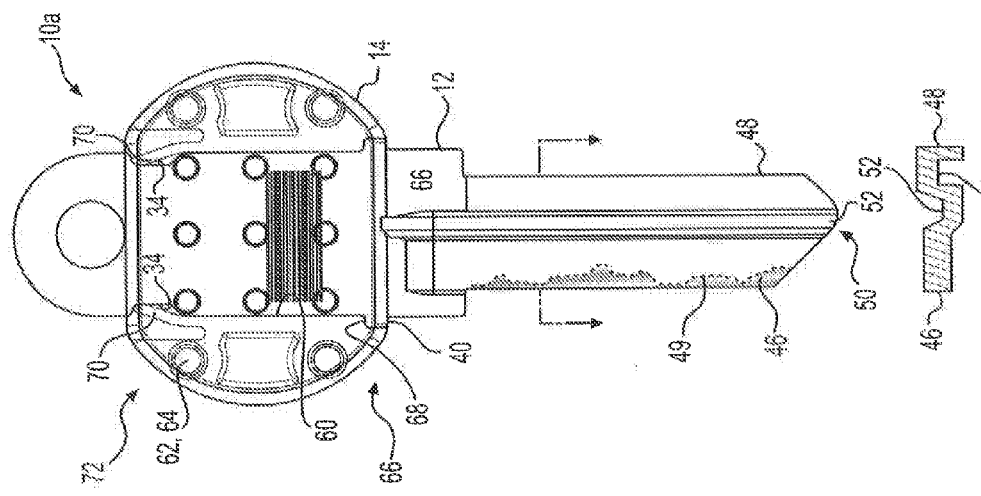

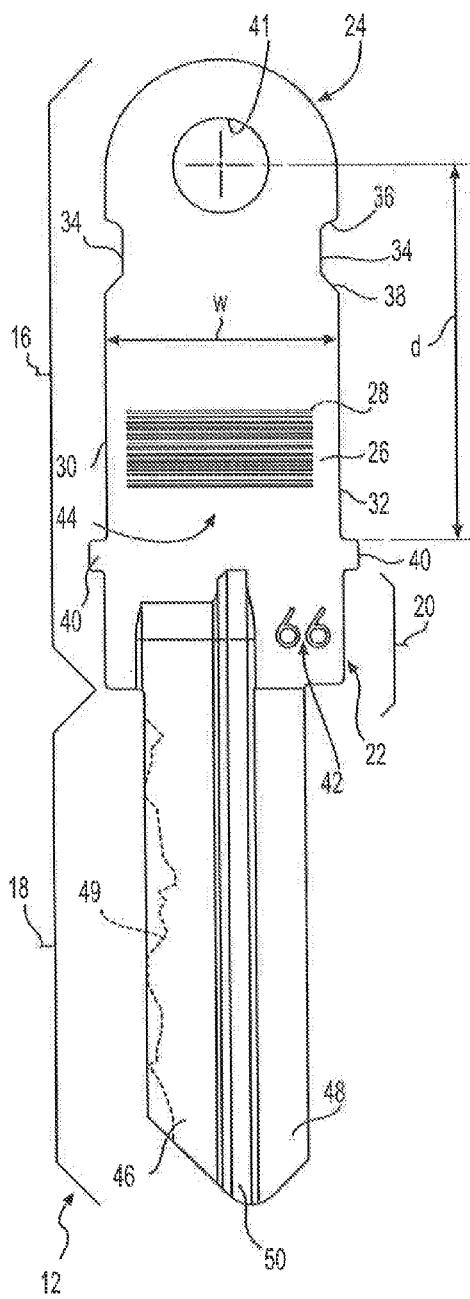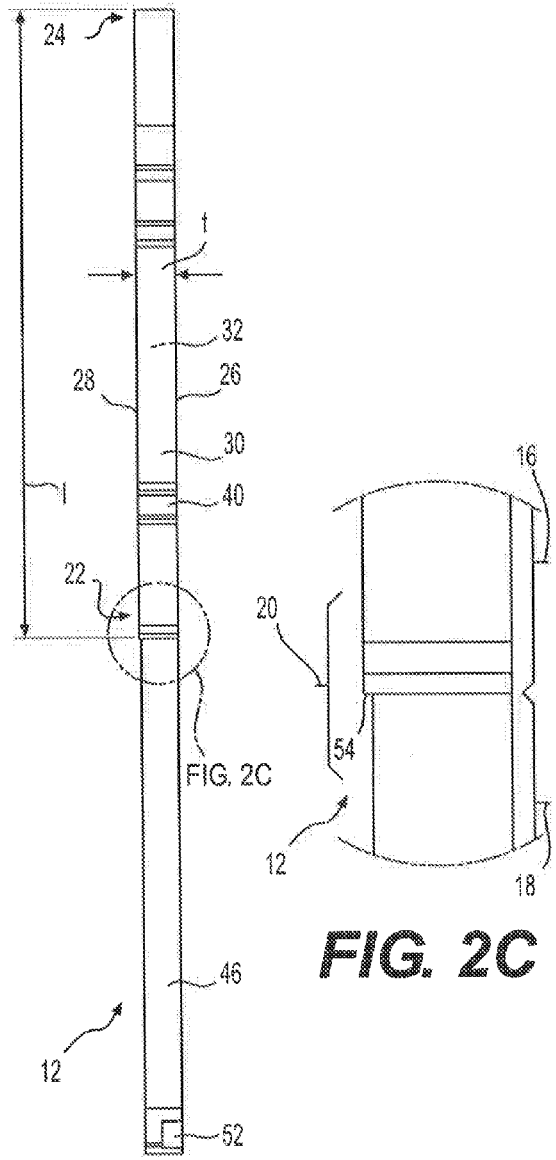
FIG. 2A
FIG. 2B
FIG. 2C

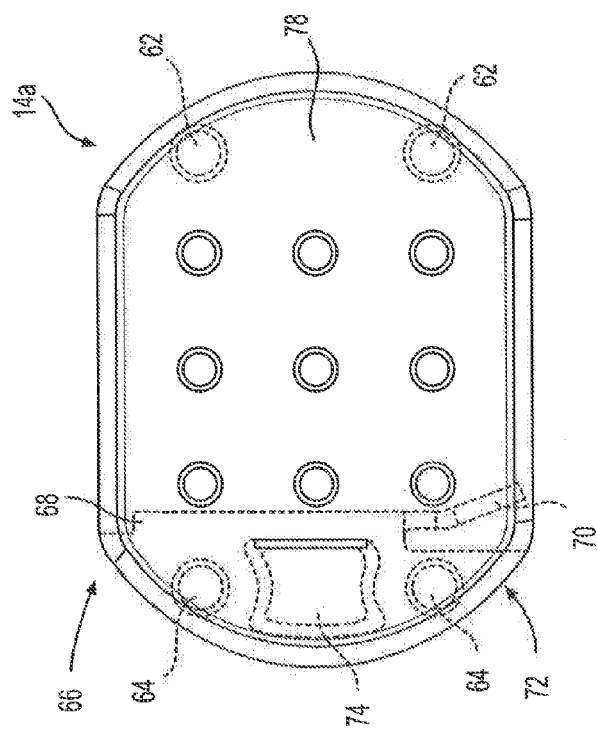
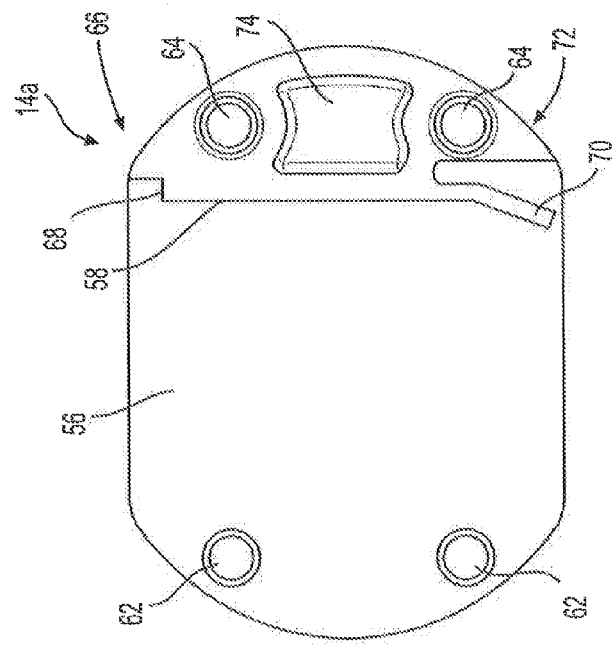
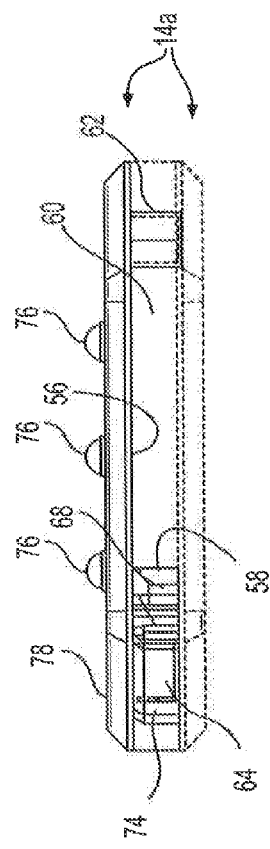

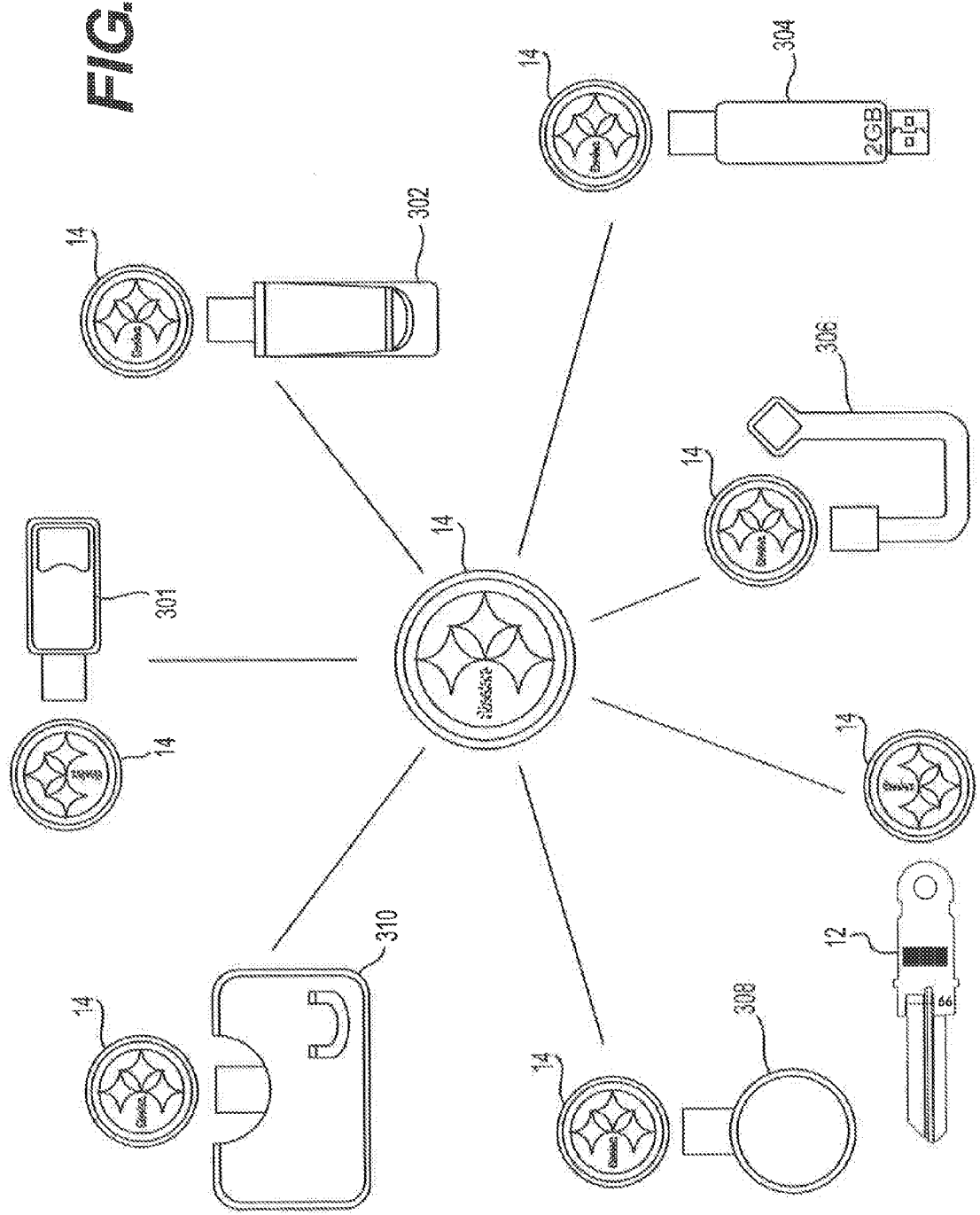

TWO-PIECE KEY ASSEMBLY

RELATED APPLICATIONS

This is a divisional of application Ser. No. 14/252,412, filed Apr. 14, 2014 which is a non provisional application of Provisional No. 61/866,603 filed Aug. 16, 2013 and Provisional No. 61/904,810 filed Nov. 15, 2013, the contents of which are expressly incorporated herein by reference.

This application is based on and claims the benefit of priority from U.S. Provisional Application No. 61/866,603 entitled MODULAR KEY DUPLICATION SYSTEM USING COMMON KEY BLANKS that was filed on Aug. 16, 2013 and from U.S. Provisional Application No. 61/904,810 entitled KEY ASSEMBLY AND DUPLICATION MACHINE that was filed on Nov. 15, 2013, the contents of both of which are expressly incorporated herein by reference.

TECHNICAL FIELD

The present disclosure is directed to a key assembly and more particularly, to a two-piece key assembly.

BACKGROUND

A master key can be duplicated in any number of different ways, by measuring a profile of the master key and duplicating that profile within a key blank. The key blank generally has a size and shape larger than the master key, so that the key blank can be machined (e.g., cut and/or milled down) to function like the master key. In order to reduce an amount of key blank inventory that a locksmith must keep on hand for duplication purposes, common or universal key blanks may be utilized.

An exemplary key for use in duplication operations is disclosed in U.S. Patent Application Publication No. 2004/0148988 of Taylor that published on Aug. 5, 2004 ("the '988 publication"). Specifically, the '988 publication discloses a metallic blade on which serrations are to be formed, and a key head made of jewelry and having a receiving slot for receiving an inserting portion of the key blade. The key head is fixed to the blade by way of friction, glue, epoxy, or welding, and includes insignia surfaces for decorative design.

Although the key of the '988 publication may be decorative and provide a customer with certain options, it may still be less than optimal. In particular, the head may be expensive to fabricate, difficult to connect to the blade, and inhibit interchangeability of heads. Further, the blade may not be conducive to an automated fabrication process.

The disclosed key assembly is directed to overcoming one or more of the problems set forth above and/or other problems of the prior art.

SUMMARY

In one aspect, the present disclosure is directed to a key assembly. The key assembly may include a blade having a head portion, a shank, and a transition region connecting the head portion to the shank. The key assembly may also include a head configured to receive the blade. The head may have a shoulder located at the transition region to limit engagement of the head with the blade, and at least one tang located at an end of the head opposite the shoulder. The at least one tang may be configured to engage the head portion and inhibit removal of the head from the blade.

In another aspect, the present disclosure is directed to a blade for a key assembly. The blade may include a shank with a proximal end and a distal end, a head portion having a base end and a tip end, and a transition region connecting the base end of the head portion to the proximal end of the shank. The blade may also include at least one shoulder located between the base end of the head and the tip end, and at least one recess located between the at least one shoulder and the tip end. The at least one recess may have ends oriented at oblique angles relative to sides of the head portion.

In another aspect, the present disclosure is directed to a head for a key assembly. The head may include at least one primary interior surface, and at least one side surface substantially perpendicular to the primary interior surface. The head may also include at least one tang connected to the at least one side surface and configured to engage a blade recess of the key assembly.

In another aspect, the present disclosure is directed to a key blank inventory system. The key blank inventory system may include a plurality of different key blades, and a plurality of different key heads. Each of the plurality of different key heads may be configured to receive each of the plurality of different key blades.

In another aspect, the present disclosure is directed to another key blank inventory system. This key blank inventory system may include a plurality of key blades, a first plurality of key heads configured to permanently connect with the plurality of key blades, and a second plurality of key heads configured to removably connect with the plurality of key blades. Each of the second plurality of key heads may have a transponder chip.

In another aspect, the present disclosure is directed to another key blank inventory system. This key blank inventory system may include a key blade, and a key head configured to receive the key blade in a single direction and lock onto the key blade in multiple orientations.

In another aspect, the present disclosure is directed to another key assembly. This key assembly may include a key blade, and a key head configured to be pushed by hand over a head portion of the key blade. The key head may resist separation from the key blade through only mechanical interlocking of the key head with the key blade.

In another aspect, the present disclosure is directed to a method of assembling a key. The method may include inserting a key blade head portion-first into a separate key head component, and deforming the separate key head component during insertion. The method may also include allowing the separate key head component to return to a near original shape after insertion of the key blade to inhibit removal of the key blade.

In another aspect, the present disclosure is directed to an inventory system of consumer-oriented hand-held components. The inventory system may include a plurality of different key blades, and a plurality of different handheld non-key related utensils. The inventory system may also include a plurality of different heads, each being permanently connectable with each of the plurality of different key blades and with each of the plurality of different handheld non-key related utensils.

In another aspect, the present disclosure is directed to an inventory system. The inventory system may include a key blade configured to have notches formed therein at a point of purchase, and a key head configured to be manually assembled without tooling to the key blade at the point of purchase.

BRIEF DESCRIPTION OF THE DRAWING

FIGS. 1A-1C are front view and end view illustrations of three different exemplary disclosed key assemblies;

FIGS. 2A-2C are front and side view illustrations of an exemplary disclosed key blade that forms a portion of the key assembly of FIG. 1A;

FIGS. 3A-3C are front, back, and side view illustrations of an exemplary disclosed head that receives the key blade of FIGS. 2A-2C to form the key assembly of FIG. 1A;

FIG. 5 is a top view illustration of an exemplary disclosed inventory system of consumer-oriented handheld components.

DETAILED DESCRIPTION

Figure 4:
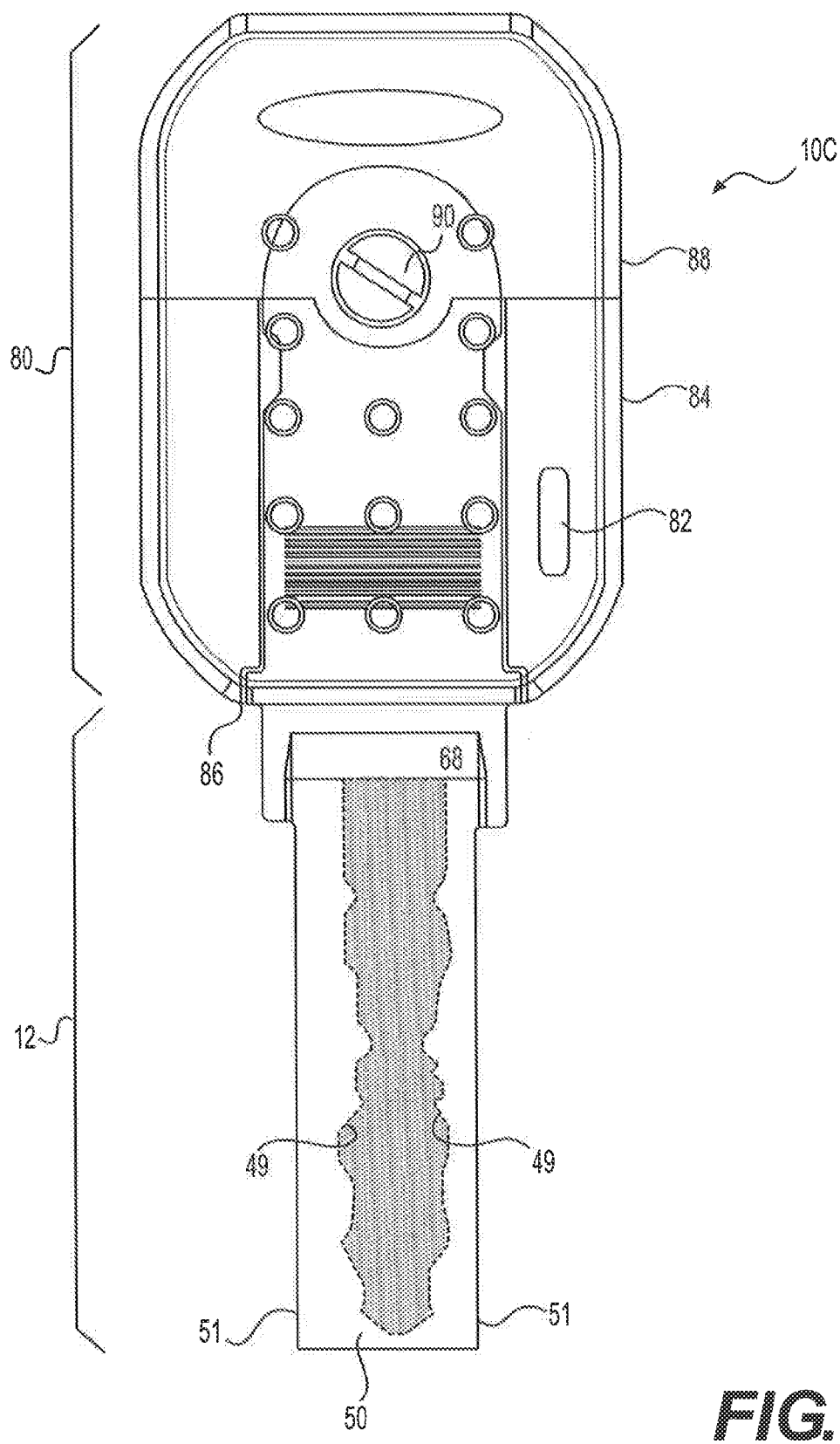
FIG. 4 is a front view illustration of another exemplary disclosed key assembly.

FIGS. 1A-1C illustrate three different exemplary key assemblies 10a, 10b, and 10c, which will collectively be referred to as key assembly 10 in this disclosure. Each key assembly 10 may be used as a means for gaining access to a variety of different secure applications, for example to automotive applications (e.g., door and ignition locks), to residential applications (e.g., dead bolt and handle locks), and to commercial applications (e.g., equipment and facility locks). Each key assembly 10 may generally include a blade 12, and a head 14 that is connected to blade 12. As shown in FIGS. 1A-1C, head 14 is a separate component or subassembly of components that is connected to blade 12 before or after formation of desired features within blade 12. It is contemplated that head 14 may be fixedly or removably connected to blade 12, as desired. When head 14 is connected to blade 12, one end or both ends (both ends shown in FIGS. 1A-1C) of blade 12 may protrude a distance from head 14. Head 14 may serve as a handle through which a user generates torque within blade 12, causing an associated lock to turn and open or close.

As shown in FIGS. 1A-1C, each of key assemblies 10a-10c may be a different type of key assembly. In particular, key assembly 10a may have a single edge-cut form (shown in FIG. 1A); key assembly 10b may have a dual edge-cut form (shown in FIG. 1B); and key assembly 10c may have a milled form (shown in FIG. 1C). In general, key assembly 10a, having the single edge-cut form, may include blade 12 with a single relatively thinner lengthwise outer edge 46 that is configured to be notched in a particular pattern (shown in phantom lines as notches 49) corresponding to the lock intended to receive blade 12, and a single relatively thicker opposing outer edge 48 that does not include notches 49. Key assembly 10b with the dual edge-cut form may have two opposing outer edges 46 that are notched and thinner relative to a thicker center section 50. Center sections 50 within blades 12 of both the single and dual edge-cut key assemblies 10a, 10b may include one or more channels 52 formed therein, such that an endwise cross-section of each assembly has a general zigzag shape. Key assembly 10c, having the milled form, may include relatively thicker square outer edges 51, with a planar center section 50 of about the same thickness (i.e., a cross-section of a milled form may be generally rectangular). Center section 50 of the milled key assembly 10c generally has an internal pattern of notches 49 that is milled within center section 50 and located away from edges 51, the pattern being variable and corresponding to the lock intended to receive blade 12.

An exemplary blade 12 for single edge-cut key assembly 10a is shown in FIGS. 2A-2C. As shown in these figures, blade 12 may include a head portion 16, and a shank 18 that is integrally formed with head portion 16. Head portion 16 may join shank 18 at a transition region 20. In the disclosed embodiment, blade 12 is formed from aluminum, brass, bronze, or another metal alloy through a stamping process and may or may not be painted or otherwise plated with a colored film. It is contemplated, however, that another material and/or process may be utilized to form blade 12, if desired.

Head portion 16 of blade 12 may have geometry designed to interact with corresponding geometry of head 14 (referring to FIGS. 1A-1C). In particular, as shown in FIGS. 2A-2C, head portion 16 may be generally plate-like, having a substantially uniform thickness t along its length l from a square shaped base end 22 within transition region 20 to a rounded tip end 24. In the disclosed embodiment, thickness t between opposing primary surfaces 26, 28 may be about 0.075-0.1 inches (e.g., about 0.08 inches) and length l may be about 1.25-1.5 inches (e.g., about 1.33 inches). Head portion 16 may also have a generally uniform width w between opposing side surfaces 30, 32 of about 0.4-0.5 inches (e.g., about 0.486 inches). These specific dimensions may be selected to produce a slip fit of head portion 16 within an internal cavity of head 14. Head portion 16 may be engaged on its two primary faces 26, 28 and its two substantially perpendicular side surfaces 30, 32 when sliding received within head 14.

Each head portion 16 may also have geometry designed to inhibit removal of blade 12 from head 14. In particular, one or more recesses 34 may be formed within side surfaces 30, 32 and configured to receive corresponding locking features of head 14. Recesses 34 may have opposing ends 36, 38 that are angled obliquely outward and configured to engage or provide clearance for the locking features, respectively. It is contemplated that the angular orientation of ends 36, 38 may be the same or different, as desired. A pair of shoulders 40 may protrude from side surfaces 30, 32, at a common location between recesses 34 and base end 22. Shoulders 40 may be located a particular distance away from recesses 34 and function as end stops for head 14 during assembly (see FIGS. 1A-1C). Shoulders 40 may also inhibit head 14 from being installed incorrectly (i.e., upside down) onto key blade 12. In some embodiments, a shape, size, and/or position of shoulders 40 may also be used to determine an identity of blade 12 and/or to locate blade 12 during a cutting process, if desired.

In some embodiments, an accessory engagement feature (e.g., an eyelet) 41 may be formed at tip end 24 and configured to engage a separately purchased accessory (e.g., a key ring). In these same embodiments, eyelet 41 may function as an additional or alternative locating feature used during cutting of shank 18, if desired. For example, a center of eyelet 41 may be precisely located a distance d from shoulders 40 and/or from base end 22 (e.g., about 0.7-0.8 inches from shoulders 40). Although tip end 24 is shown as having a generally curved outer periphery that enhances rigidity of head portion 16, it is contemplated that head portion 16 could alternatively have an angled or square outer periphery if desired.

One or more identification indices may be formed within or otherwise applied to head portion 16 and used to identify blade 12 as a particular one of a plurality of known types of key blades. In the disclosed example, two indices are shown, including a first index 42 and a second index 44. Indices 42, 44 may take any form known in the art for relaying information regarding the identity of blade 12, and indices 42, 44 may be the same or different. For example, index 42 may be a type of index readable by a key duplication technician and still visible after head 14 is assembled to blade 12. In the same example, index 44 may be a type of index that is machine readable and visible only before and/or during cutting of shank 18 (i.e., index 44 may be located at a center of where head 14 is to be installed). Examples of different types of indices include alpha-numeric symbols (see index 42 in FIGS. 1A-2A), bar codes (see index 44 in FIGS. 1A-2A), data matrices, QR codes, etc. Although the depicted blade 12 includes indices 42, 44 located at only one side (i.e. only at primary surface 26), it is contemplated that indices 42, 44 could be located at both sides and/or at other positions, if desired.

In some embodiments, shank 18 may have a thickness different than a thickness of head portion 16. In these embodiments, a step 54 (shown only in FIG. 2C) may be located at transition region 20, and transition region 20 may extend from shoulders 40 to base end 22. This step may be the result of a first type of blade 12 having either its head portion 16 or its shank 18 milled thinner after formation through the stamping process discussed above. That is, all blades 12 may need to have a common thickness at head portion 16 to properly receive a common head 14, but blades 12 of different key types may have shanks 18 with a thickness that is the same or different (i.e., thicker or thinner). In situations where shank 18 is required to be thicker than the common head portion thickness, all of blade 12 may be stamped from a thicker material and then head portion 16 may be machined thinner to the common thickness. In contrast, in situations where shank 18 is required to be thinner than the common head portion thickness, all of blade 12 may be stamped from material having the common head thickness, but then shank 18 may be machined thinner. In other words, after stamping of different blades 12, some blades (e.g., the most commonly used blades 12) may be ready for notching (i.e., cutting and/or milling) without further change, while other blades 12 may need to have their head portions 16 or their shanks 18 machined to be thinner, depending on the requirements of the corresponding locks. But in all situations, head portions 16 may have the same thickness when formation of blade 12 is complete. It is contemplated that, in some applications, a length of blade 12 may also need to be shortened during the duplication process.

Head 14, in the embodiments of FIGS. 1A-1C, is a subassembly of two substantially identical head components 14a oriented in opposition to each other. As shown in FIGS. 3A-3C, each head component 14a may include a primary interior surface 56 and a side surface 58 that is substantially perpendicular to primary interior surface 56. When two head components 14a are placed together in opposite orientation relative to each other with primary interior surfaces 56 facing each other and side surfaces 58 facing each other), a cavity 60 (shown only in FIG. 3C) may be formed that is configured to slidingly receive head portion 16 of blade 12. One or more connecting features may be associated with each head component 14a and configured to engage corresponding features in the mating head component 14a, thereby maintaining connection between head components 14a. For example, one or more pins 62 may protrude at one edge of primary interior surface 56 and be received within one or more corresponding bores 64 located at an opposing edge of primary interior surface 56. Accordingly, when two head components 14a are pressed together, four pins 62 (one located at each corner of primary interior surface 56) may enter four bores 64. In some embodiments, removal of pins 62 from bores 64 may be inhibited to thereby prevent unintended disassembly of head 14. Pins 62 may be inhibited from removable by way of an interference fit, an adhesive, or another mechanism known in the art.

In other embodiments, head 14 is a single-piece integral component having many features in common with the two head components 14a described above. In these embodiments, the single-piece head 14 includes two primary interior surfaces 56 and two side surface 58 that are substantially perpendicular to primary interior surfaces 56 to form cavity 60. In this arrangement, no subassembly is required and no corresponding connecting features (i.e., pins 62 or bores 64) are formed within head 14.

In either of the two-piece or single-piece embodiments of head 14, a first end 66 of head 14 may be pushed by hand (i.e., without the use of tooling) over tip end 24 of blade 12 and pushed toward shank 18. Two steps 68 may be formed at first end 66 (e.g., one step 68 within each head component 14a) and configured to engage shoulder 40 of blade 12 (see FIGS. 1A-1C), thereby positioning head 14 at a desired location along blade 12. Two tangs 70 may be located at a second end 72 of head 14 (e.g., one tang 70 within each head component 14a) and configured to deflect out of the way (i.e., deform) of blade 12 (i.e., out of cavity 60) during insertion and then return to a near original position (shown in FIGS. 1A-1C) within recesses 34 of blade 12, thereby mechanically interring with and thereby inhibiting removal of head 14 from blade 12. Each tang 70 may have a proximal end near a center of head 14, and a distal end that protrudes toward second end 72 at an inward angle. The angle of recess end 36 (referring to FIG. 2A) may allow for a secure seating of tang 70 without binding (see FIGS. 1A-1C), while the angle of recess end 38 may provide, clearance for the inward intrusion of tang 70. In this configuration, the only way that head 14 could be removed from blade 12 would be to cause buckling or other physical alterations of tangs 70, which would require significant force. In some embodiments, there may not be sufficient space within cavity 60 for tangs 70 to buckle, making removal of head 14 even more difficult, if not impossible, without destruction of head 14.

In the disclosed embodiment, head 14 is injection molded from a plastic material. Accordingly, head 14 (e.g., each head component 14a) may have features that facilitate this fabrication method and/or material. For example, a pocket 74 may be formed at a location between bores 64 (if bores 64 are present). Pocket 74 may help to keep all walls of head 14 at about the same thickness, thereby reducing the formation of voids or uneven surfaces during molding. It is contemplated that pocket 74 may be omitted, if desired. It is also contemplated that head 14 could be fabricated from other materials and/or through other processes.

Head 14 may also include features that improve use of key assembly 10. For example, head 14 may include one or more friction-enhancing features, such as raised bumps 76 at an outer surface 78. These features may help to reduce the likelihood of a customer's hand slipping during use of key assembly 10. Head 14 may also have a smooth, rounded periphery that helps to reduce snagging. Head 14 may be fabricated in a variety of colors and/or shapes.

There may be times when removal head 14 from key blade 12 without causing damage to head 14 is desirable. For example, when notches 49 have not been properly fabricated within key blade 12 and/or when damage to key blade 12 has occurred, it may be desirable to remove head 14 and reuse head 14 with another key blade. This may be particularly true when head 14 is a transponder head, which is generally more expensive than a standard or non-transponder head. FIG. 4 illustrates an exemplary embodiment of key assembly 10 (e.g., 10c) having a transponder head 80 connected to key blade 12. In this embodiment, transponder head 80 is a two-piece component having a transponder chip 82 removably or fixedly contained inside. Specifically, transponder head 80 may include a lower component 84 having an opening 86 to receive head portion 16 of key blade 12 (shank-first), and an upper component on 88 configured to mate with lower component 88 and thereby inhibit removal of key blade 12. Transponder chip 82 may be located within lower or upper components 84, 88, as desired. A fastener (e.g., a screw, a clip, etc.) 90 may connect upper component 88 to lower component 84. It should be noted that other removable head designs having transponder chip 82 may be utilized together with key blade 12.

FIG. 5 shows alternative uses of head 14 within an inventory system of consumer-oriented handheld components. In particular it may be profitable to design head 14 to receive items other than just blade 12. For example, handheld consumer-oriented items or utensils, such as a bottle opener 301, a money clip 302, a portable media drive 304, a purse hook 306, a key ring 308, and a refrigerator magnet 310, may be fabricated with geometry similar to the geometry of bead portion 16 of key blade 12, such that these items can accept and lock together with head 14 in the same manner described above. It is contemplated that these items may be purchased along with head 14 and blade 12 at a point of sale. In one embodiment, head 14 may even be customized the point of sale, for example head 14 may be decorative in nature and printed on, etched, milled, applied with an adhesive backing, etc. to bear a desired shape, symbol, logo, and/or image.

INDUSTRIAL APPLICABILITY

The disclosed key assembly may be utilized for duplicating a single edge-cut key, a dual edge-cut key, and a side-milled key. The disclosed key assembly may be easy to use and facilitate accurate duplication with a reduced number of miscuts. An exemplary duplication process using the disclosed key assembly will now be described in detail.

To begin the fabrication process (i.e., the process of creating notches 49 within key blade 12), a customer or sales associate must identify the master key to be duplicated. This identification may be completed manually or automatically, and include a type of lock to which the key corresponds; a year, make, or model of the corresponding application; as known or measured notch pattern; and/or a type, size, shape, or model of the corresponding key blank. Based on this information, a key blade 12 that should be used in the fabrication process may be selected. This selection may be performed manually or automatically, as desired.

Once the appropriate key blade 12 corresponding to the master key has been selected, the key blade 12 may be retrieved from inventory and cut to have notches 49 that correspond with the notch pattern of the master key. In some instances, the identity of the retrieved key blade 12 may be confirmed before cutting may begin. And this confirmation may be done in several different ways. In one application, a store sales associate (or the end user or customer themselves) may compare index 42 of the retrieved key blade 12 with the intended index 42 of the selected key blade 12. For example, the key blade 12 selected based on the identification information of the master key may be a key type #66. In this example, the store sales associate may ensure that index 42 of the retrieved key blade 12 has #66 stamped therein. In another application, identity confirmation of the retrieved key blade 12 may be performed automatically by a duplication machine (not shown). For example, the duplication machine may detect index 44 (e.g., the barcode printed on or otherwise applied to head portion 16 as a decal, a tag, a label, chemical etching, a sleeve, etc.), identify the retrieved key blade 12 based on stored information corresponding to the detected index 44, and compare the identity with the intended identity of the selected key blade 12.

After the identity of the retrieved key blade 12 has been confirmed, the fabrication of notches 49 may begin. In manual processes, the retrieved key blade 12 may be manually mounted within a clamp and then positioned to engage a cutting wheel and/or a milling head. And during this process, key blade 12 may be manually moved relative to the cutting wheel and/or milling head in such a way that the desired notch pattern is created within blade 12. This may be performed, for example, using a tracing apparatus in association with a master key. It is also contemplated that the cutting wheel and/or milling head could alternatively be held stationary, and key blade 12 moved to cut the notch pattern, if desired.

In an automated cutting process, the retrieved key blade 12 may be inserted into a cutting module of a duplication machine. In some instances, only shank 18 may need to be inserted into the cutting module. In other instances, all of key blade 12 may need to be inserted. Regardless of the configuration of the particular cutting module, index 44 may be used to facilitate the cutting process. For example, a scanner, camera, or other detection device may be located to detect the barcode of index 44 once key blade 12 (or only shank 18) has been inserted into the cutting module. In some instances, this detection may be part of the identity confirmation step described above. In other instances, this detection may be an additional step.

Detection of index 44 within the cutting module may be used to confirm that key blade 12 has been inserted properly into the cutting module. For example, the barcode of index 44 may be located on only one side of key blade 12. And when index 44 is not detected upon insertion of key blade 12, it may be concluded that key blade 12 is not inserted properly. Improper insertion may include not fully inserting key blade 12 or inserting key blade 12 upside-down. When this occurs, key blade 12 may need to be pushed in further or pulled out and turned over.

The information encoded within index 44 may be used within an automated key fabrication machine to cut the desired pattern of notches 49. For example, the information encoded within the barcode of index 44 may include the identity of key blade 12, geometry of key blade 12 (e.g., size, shape, material, etc.), and/or damping requirements (location, orientation, position, force, etc.) of key blade 12. This information may be deciphered by the cutting module of the automated fabrication machine, and used to set up the machine in such a way that allows proper cutting of key blade 12.

Before, during, and after the cutting process has been completed, a sales transaction associated with the cutting process may be completed. This sales transaction may include using the barcode of index 44 to determine the key blade 12 used for the process, a type of cutting process involved (e.g., cutting or milling), a corresponding reduction in key blade inventory, and/or a cost of the transaction. For example, the sales associate may scan the bar code on head portion 16, and charge the customer as corresponding amount at a point of sale. At this same time, the customer may also choose and pay for a corresponding head 14.

Thereafter, the sales associate or the customer may assemble head 14 to key blade 12, by pushing end 66 of head 14 over tip end 24 of head portion 16. Head 14 may be assembled to key blade 12 in only a single direction head-first) and in two different orientations (e.g., a front orientation and a back orientation) that are 180° rotated from each other about a length direction of key blade 12.

The disclosed key assembly may be inexpensive to fabricate, simple to assembly, and provide for bead/blade interchangeability. Specifically, with key blades 12 being stamped and head 14 being molded, the cost of fabrication may be reduced. In addition, a common or universal key blade 12 may be used to make many different types, styles, and sizes of keys. And likewise, head 14 may be used on many different key blades 12. This commonality may help to keep the number of different key blades 12 and heads 14 low and the volume high, which further reduces component cost. Further, because head 14 can be connected to key blade 12 simply by pushing head 14 over head portion 16, the time and effort associated with assembly may be low. And the low cost nature and commonality of head 14 and the ease of assembly may allow for the customer to choose from many different styles, configurations, and/or colors of heads to be used with any key blade 12.

In addition, because head 14 may be universal and can be connected to any key blade 12, the customer may be provided with greater variety. Specifically, a greater assortment of different head designs may be provided with reduced inventory, as each different head 14 can fit any key blade 12. Instead of having to make dozens of different key heads each having the same logo or design that fit dozens of different key blades, one head may be created that fits all key blades 12; and each head 14 may have a different logo. Thus a greater variety of heads 14 may be created and stocked in inventory for use by the customer.

Further, by having two different subsets of heads, one removable and the other non-removable, a cost of an associated key blank inventory system may be small. Specifically, heads 14 may be relatively cheaper than heads 80, because heads 14 do not include transponders 82. Accordingly, heads 14 may be cheap enough to discard, if necessary due to fabrication error or key blade damage. For this reason, heads 14 do not need to have geometry that allows heads 14 to be removable and reusable. This geometry may increase a cost of key assembly 10 and, accordingly, may only be useful with the more expensive key assemblies 10 having transponders. Thus, by having two sets of key assemblies with two different types of heads, the cost of the inventory system may be low.

It will be apparent to those skilled in the art that various modifications and variations can be made to the disclosed key assembly. Other embodiments will be apparent to those skilled in the art from consideration of the specification and practice of the disclosed key assembly. It is intended that the specification and examples be considered as exemplary only, with a true scope being indicated by the following claims and their equivalents.

What is claimed is:

1. A key blank inventory system, comprising:
   a plurality of different key blades; and
   a plurality of different key heads, each of the plurality of different key heads being configured to receive each of the plurality of different key blades,
   wherein:
   a first subset of the plurality of different key heads is inhibited from being removed from the plurality of different key blades after assembly without physical alteration of the first subset of the plurality of different key heads; and
   a second subset of the plurality of different key heads is removable from the plurality of different key blades after assembly without physical alteration of the second subset of the plurality of different key heads that renders the second subset of the plurality of different key heads non-reusable.

2. The key blank inventory system of claim 1, wherein each of the second subset of the plurality of different key heads includes a transponder chip.

3. The key blank inventory system of claim 1, wherein the first subset of the plurality of different key heads is inhibited from being removed by way of mechanical interference between the first subset of the plurality of different key heads and the plurality of different key blades.

4. The key blank inventory system of claim 3, wherein each of the first subset of the plurality of different key heads is configured to deform during connection with the plurality of different key blades, and return to a near original shape after connection.

5. The key blank inventory system of claim 1, wherein:
   each of the plurality of different key blades is functional to actuate a different lock type after formation of notches therein; and
   each of the plurality of different key heads is decorative in nature and includes a different design.

6. A key blank inventory system, comprising:
   a plurality of key blades; and
   a first plurality of key heads configured to permanently connect with the plurality of key blades; and
   a second plurality of key heads configured to removably connect with the plurality of key blades,
   wherein each of the second plurality of key heads includes a transponder chip.

7. The key blank inventory system of claim 6, wherein:
   the first plurality of key heads is configured to deform during connection with the plurality of key blades, and return to a near original shape after connection; and
   the second plurality of key heads does not deform during connection to with the plurality of key blades.

8. The key blank inventory system of claim 7, wherein the first plurality of key heads is physically altered when removed from the plurality of key blades so as to not be reusable.

9. A key blank inventory system, comprising:
   a key blade;
   a key head configured to receive the key blade in a single direction and lock onto the key blade in multiple orientations, wherein the key head is configured to deform when receiving the key blade; and
   a second key head configured to receive the key blade without deforming.

10. The key blank inventory system of claim 9, wherein the key head is configured to receive the key blade in a head-first direction.

11. The key blank inventory system of claim 10, wherein the key head is inhibited from receiving the key blade in a shank-first direction.

12. The key blank inventory system of claim 10, wherein the key head is configured to receive the key blade in a front facing orientation and in a rear facing orientation that is about 180° rotated about a length direction of the key blade.

13. The key blank inventory system of claim 9, wherein the key head is configured to return to a near original shape after receiving the key blade to create a mechanical interference between the key head and the key blade that inhibits removal of the key head.

\* \* \* \* \*